US009353005B2

(12) United States Patent
Aberle et al.

(10) Patent No.: US 9,353,005 B2
(45) Date of Patent: May 31, 2016

(54) PROCESS FOR PRODUCTION OF POWDER REDISPERSIBLE IN WATER AND USE THEREOF

(71) Applicant: AKZO NOBEL N. V., Arnhem (NL)

(72) Inventors: Thomas Aberle, Nottwil (CH); Adrian Keller, Rupperswil (CH)

(73) Assignee: AKZO NOBEL N.V., Arnhem (NL)

( * ) Notice: Subject to any disclaimer, the term of this patent is extended or adjusted under 35 U.S.C. 154(b) by 173 days.

(21) Appl. No.: 14/182,405

(22) Filed: Feb. 18, 2014

(65) Prior Publication Data

US 2014/0316029 A1 Oct. 23, 2014

Related U.S. Application Data

(60) Division of application No. 13/176,544, filed on Jul. 5, 2011, now abandoned, which is a continuation of application No. 12/066,755, filed as application No. PCT/EP2006/009191 on Sep. 21, 2006, now abandoned.

(30) Foreign Application Priority Data

Sep. 27, 2005 (EP) ..................................... 05021009

(51) Int. Cl.
| C08J 3/12 | (2006.01) |
| C04B 24/34 | (2006.01) |
| C04B 24/26 | (2006.01) |
| C04B 40/00 | (2006.01) |
| C04B 103/00 | (2006.01) |
| C04B 111/00 | (2006.01) |
| C04B 111/21 | (2006.01) |

(52) U.S. Cl.
CPC ............. *C04B 24/34* (2013.01); *C04B 24/2623* (2013.01); *C04B 40/0039* (2013.01); *C04B 40/0042* (2013.01); *C04B 2103/0057* (2013.01); *C04B 2111/00517* (2013.01); *C04B 2111/00672* (2013.01); *C04B 2111/21* (2013.01)

(58) Field of Classification Search
CPC .................................. C04B 24/10; C04B 24/42
See application file for complete search history.

(56) References Cited

U.S. PATENT DOCUMENTS

| 3,423,219 | A | | 1/1969 | Stone et al. |
| 3,434,944 | A | | 3/1969 | Horner et al. |
| 5,356,963 | A | | 10/1994 | Kauffman et al. |
| 5,641,535 | A | | 6/1997 | Eck et al. |
| 5,753,733 | A | * | 5/1998 | Eck ........................... C08F 2/24 524/265 |
| 5,863,862 | A | | 1/1999 | Eck et al. |
| 5,994,438 | A | | 11/1999 | Geissler et al. |
| 6,022,947 | A | | 2/2000 | Frihart et al. |
| 6,090,868 | A | * | 7/2000 | Eck ........................... C04B 28/02 106/287.16 |
| 6,133,345 | A | | 10/2000 | Pakusch et al. |
| 6,140,400 | A | | 10/2000 | Figge et al. |
| 6,191,235 | B1 | * | 2/2001 | Eck ...................... C04B 40/0042 524/265 |
| 6,242,512 | B1 | | 6/2001 | Figge et al. |
| 6,302,955 | B1 | | 10/2001 | Kerkar et al. |
| 6,316,568 | B1 | | 11/2001 | Kohlammer et al. |
| 6,559,259 | B2 | | 5/2003 | Kohlhammer et al. |
| 6,900,259 | B2 | | 5/2005 | Klein et al. |
| 2002/0165341 | A1 | * | 11/2002 | Weitzel ............... C04B 24/2641 528/500 |
| 2005/0098062 | A1 | | 5/2005 | Butler et al. |
| 2006/0254468 | A1 | | 11/2006 | Bastelberger et al. |

FOREIGN PATENT DOCUMENTS

| DE | 3321027 A1 | 12/1984 |
| DE | 4131939 A1 | 4/1993 |
| DE | 19601697 A1 | 7/1997 |
| DE | 103 23 205 A1 | 12/2004 |
| EP | 0 723 975 A1 | 7/1996 |
| EP | 0 799 876 A2 | 10/1997 |
| EP | 0 874 471 B1 | 10/1998 |
| EP | 0 874 871 B1 | 11/1998 |
| EP | 0 874 877 B1 | 11/1998 |
| GB | 1088484 | 10/1967 |
| GB | 1088485 | 10/1967 |
| GB | 1 474 442 | 5/1977 |
| GB | 2 343 448 A | 5/2000 |
| JP | 47-15840 | 5/1972 |
| JP | 60-16843 A | 1/1985 |
| JP | 1-239047 A | 9/1989 |
| JP | 1-252652 A | 10/1989 |

(Continued)

OTHER PUBLICATIONS

Mexican Office Action Summary of related Application No. MX/a/2008/004090 dated Mar. 6, 2014.

(Continued)

*Primary Examiner* — Hannah Pak

(74) *Attorney, Agent, or Firm* — Sandra B. Weiss

(57) ABSTRACT

The present invention relates to a process for the production of powders redispersible in water comprising an organic component and a water-soluble organic polymeric protective colloid. The organic component is dispersed and stabilized with the protective colloid in water to form a stable dispersion which is dried to form the powder redispersible in water. The organic component comprises abietic acid, sylvic acid, neoabietic acid, levopinaric acid, pimaric acid, isopimaric acid and/or palustric acid and/or their derivatives. The water-soluble organic polymeric protective colloid comprises synthetic protective colloids and naturally and/or synthetically produced biopolymer which can be synthetically modified. The obtained powder reduces efflorescence in hydraulically set systems.

14 Claims, No Drawings

(56) References Cited

FOREIGN PATENT DOCUMENTS

| | | |
|---|---|---|
| WO | WO 95/02836 A1 | 1/1995 |
| WO | WO 95/26937 A1 | 10/1995 |
| WO | WO 97/38950 A1 | 10/1997 |

OTHER PUBLICATIONS

Palkin et al., "A New Non-Crystallizing Gum Rosin," U.S. Dept. of Agriculture, May 1938, pp. 120-122.

International Search Report for International Application No. PCT/EP2006/009191 dated Jan. 11, 2007.

DIN 53015, Viscometry—Measurement of viscosity using the Hoppler falling-ball viscometer, Feb. 2001, English-language translation provided.

DIN 53019, Viscometry—Measurement of viscosities and flow curves by means of rotational viscometers, Sep. 2008, English-language translation provided.

English abstract of DE 3321027 A1 published Dec. 13, 1984.

English machine translation of JP 47-15840 publishsed May 11, 1972.

English abstract of JP 60-16843 A published Jan. 28, 1985.

English abstract of JP 1-239047 A published Sep. 25, 1989.

English abstract of JP 1-252652 A published Oct. 9, 1989.

JP Office Action for Japanese Application No. 2008-532640 dated Oct. 2, 2012.

JP English language machine translation for Office Action for Japanese Application No. 2008-532640 dated Oct. 2, 2012.

* cited by examiner

PROCESS FOR PRODUCTION OF POWDER REDISPERSIBLE IN WATER AND USE THEREOF

The present invention relates to a powder redispersible in water for the reduction of efflorescence in hydraulically set systems based on at least one organic component and at least one water-soluble organic polymeric protective colloid, to a process for its production including dispersion with subsequent drying, it being possible to omit the drying step, and to its advantageous use in particular as additive for hydraulically setting systems for the reduction of efflorescence in hydraulically set systems.

Efflorescence is known to occur in particular in cementitious systems such as concrete, rendering and mortars. The expert means by it whitish deposits on the surface which are formed above all by leached-out calcium hydroxide which is reacted further by carbon dioxide from the air to form calcium carbonate. In this case, further salt deposits may also be present. Although such efflorescence usually have no major influence on the physical values of the substrate, they are regarded a major nuisance particularly in the case of coloured or grey surfaces.

Lacking alternatives, the formulation developer frequently tries to prevent efflorescence by means of hydrophobic additives. In this case, the idea plays a part that, if no water is able to penetrate into the mortar layer, rendering layer or concrete layer, no calcium hydroxide can be washed out. However, this is an erroneous conclusion to be drawn: on the one hand, the freshly applied material still contains a lot of water which, together with dissolved salts, migrates to the surface. If the water evaporates, the salt residues remain as undesired residues. In addition, water can also diffuse from the other side through the hydraulically set material and thus have the same effect. On the other hand, it is practically impossible to obtain absolute hydrophobicity. Even if the surface exhibits an excellent water repellency, it is sufficient, if only a little water penetrates inside, to leave a white residue behind after drying of the water droplet. Thus, many highly hydrophobic materials exhibit a stronger efflorescence effect than others. This shows also clearly that hydrophobicity and efflorescence are based on quite different mechanisms and are not comparable with each other.

Thus, DE 103 23 205 A1, for example, describes a hydrophobing, water-redispersible additive based on fatty acids and their derivatives which contain water-soluble protective colloids and one or several compounds from the group of fatty acids and fatty acid derivatives which, under alkaline conditions, liberate fatty acid or the corresponding fatty acid anion, where required in combination with one or several organosilicon compounds. By using this additive in mortars, the water absorption is substantially reduced but not prevented. There is no mention of a possible reduction of efflorescence. Moreover, highly volatile organic components (VOC) are usually formed by the alkaline hydrolysis of the fatty acid derivatives.

U.S. Pat. No. 3,423,219 describes a process for the production of Portland cement. During this process, an aqueous dispersion of a mixture of tall oil resin and high-boiling fractions of tall oil is preferably admixed to the Portland cement as painting aid. The process for the production of such dispersions comprises, among other things, an alkaline treatment and is consequently complicated and expensive. The use of such systems for reducing efflorescence is not mentioned. Moreover, no powders that are soluble or redispersible in water are described, which makes the use of dry mortars, in particular, impossible.

GB 1,088,484 A describes a process for inhibiting efflorescence in concrete based on Portland cement. In this case, an aqueous dispersion of a mixture of tall oil resin and high-boiling fractions of tall oil, partially also mixed with asphalt, is preferably admixed to the concrete or subsequently applied onto the surface. The process for the production of such dispersions comprises, among other things, an alkaline treatment and is consequently highly complicated and thus expensive, the dark to black colour of the mixture restricting its use considerably. To stabilise the dispersions, 0.1 to 15% by weight of proteins or polysaccharides are used. In addition, no powders soluble or redispersible in water are described, which makes the use in particular in dry mortars impossible.

In DE 33 21 027 A1, a process is described by means of which a reduction of the efflorescence and a reduction of the water absorption, among other things, apparently occurs. During this process, terpene polymers, in particular of liquid low-molecular terpenes, are added as such or in mixture with other terpene hydrocarbons, which are added to the cement-containing building materials in a quantity of 0.1-10% by weight. The addition of the terpene-based compounds takes place in the emulsified form or by spraying liquid or dissolved terpenes, precluding the use in dry mortars, among other things. Moreover, no details are provided regarding the type of terpenes used or the emulsifiers by way of which the terpene compounds are emulsified.

JP 1 252 652 A describes an aqueous dispersion with an excellent stability for paper applications, for example. In this process, a hydrophobic substance with a low molecular weight is dispersed by means of a modified polyvinyl alcohol which contains a special cationic group, it being possible for the hydrophobic substance with a low molecular weight to be a resin. The aqueous dispersion described can be produced only with major effort since the polyvinyl alcohol with the cationic group must be produced first separately by means of the radical polymerisation of vinyl acetate and dimethyl aminoethyl vinyl ether, for example, with subsequent saponification of the copolymer. In addition, this dispersion is not obtainable in powder form and has a quite different field of application.

In EP 874 871 B1, a redispersible dispersion powder composition is described, which consists of a water-insoluble base polymer from the group of homopolymers and copolymers and a water-soluble atomisation protective colloid which contains also up to 100% by weight, based on the base polymer, of tackifying substances. The water-soluble atomising protective colloid is a non-neutralised or a partially neutralised special polymer based on homopolymers or copolymers of olefinically unsaturated monocarboxylic acids or dicarboxylic acids or their anhydrides, the acid content of the polymer amounting to 50 mole % or more. The pH of the aqueous redispersion is below 4.5. These systems can be used as adhesive composition but should also be used in cement-containing trowelling compounds, or in structural adhesives. However, these specialty polymers rapidly form complex compounds with calcium ions in hydraulically setting systems, and other ions which has a highly negative effect on hydration (substantial retardation) and on the mortar rheology (partial stiffening). For this reason, they have little suitability in particular for use in cementitious systems. A possible reduction of efflorescence is not mentioned.

EP 874 877 B1 describes a tackifyer powder composition redispersible in water containing one or several tackifying substances and 2 to 50% by weight of at least one compound from the group of water-soluble, low molecular homopolymers or copolymers of olefinically unsaturated monocarboxylic acids or dicarboxylic acids or their anhydrides, which contain, as copolymers, 2 to 50 mole % of further free radical polymerisable monomers and phenol sulphonic acid condensates, melamine sulphonic acid condensates and naphthalene sulphonic acid condensates with a water solubility of at least 10 g in 100 g of water and a molecular weight of maximum 250,000 g/mole. The tackifying substances are used as emulsifier-stabilised dispersions and are not stabilised with these polymers. In addition, they are used as adhesives and not in cementitious systems, in particular not for the reduction of efflorescence.

EP 799 876 A2 describes an adhesive composition in powder form which contains at least one polymer based on at least one dispersion, at least one tackifying resin and, where required, one or several protective colloids as well as anticaking agents. This adhesive composition is suitable for adhesive-bonding porous and semi-porous substances, in particular as flooring adhesive. Use in hydraulically setting systems is not mentioned, in particular not the use for reducing efflorescence. Moreover, it is essential for a polymer based on at least one dispersion to be contained therein, which restricts the possibilities of formulation exceedingly.

It has been the object of the invention to provide an additive which prevents or at least greatly reduces the efflorescence of hydraulically set systems; in particular those based on cement, such as e.g. in mortars, and in the case of concrete. In addition, the additive should be present in powder form in particular for the formulation of dry mortars in order to circumvent the known disadvantages of liquid raw materials such as e.g. lack of resistance to freezing/thawing or limited storage stability, without the addition of toxic biocides and to allow simple metering in the case of dry mortar formulations. However, it should also be possible to meter in the additive in the liquid form for selected applications such as e.g. the manufacture of concrete. In addition, it is essential that this additive be suitable for simply being stirred into the mortar matrix mixed with water without special mixing processes having to be taken into account. In this case, it is also very important that the additive can be thoroughly wetted in the mortar mixture, redispersed and easily homogeneously distributed in the matrix. In addition, it is important that no disadvantageous or other mortar properties are obtained by way of the additive, i.e. it should be possible for the additive to be introduced into existing mortar formulations without their properties, such as e.g. the mortar rheology, being modified, except for the desired strong reduction of the efflorescence effect and, where applicable, an improvement in the hydrophobicity and/or adhesive capacity of the mortar. It should additionally be possible to meter the additive independently of other mortar raw materials providing the formulator with a very high level of flexibility. In addition, it is important that the raw material costs and production costs of the dry mortar are not or only slightly altered by the additive. When producing the additive, it should, moreover, be possible to simply vary the primary particle size without problem in order to be able to adjust the final characteristics in a targeted manner. Moreover, it is advantageous if at least a major part of the additive can be obtained from renewable resources. Also, the additive should have no or only a very low hazards classification.

Surprisingly enough, it was possible to achieve the complex object by way of a powder redispersible in water for reducing efflorescence in hydraulically set systems based on at least one organic component and at least one water-soluble organic polymeric protective colloid and, where required, further additives, whereas
a) the organic component containing at least one compound with a cyclic group, the compound being completely or partially saturated and having a melting point of approximately −20 to 250° C. and a molecular weight of about 100 to 10,000 and the organic component containing a terpenoid, a resin acid, colophony, terpene resin, terpene-phenol resin and/or their derivatives, and
b) forming, with the water-soluble organic polymeric protective colloid, a stable dispersion in water, the water-soluble organic polymeric protective colloid having a content of monocarboxylic acid and dicarboxylic acid as well as their anhydrides of less than 50 mole % and not consisting of aromatic sulphonic acid condensates and
c) the weight ratio of the organic component to the water-soluble organic polymeric protective colloid being 95:5 to 5:95.

The organic component with a completely or partially saturated cyclic group can be a synthetically produced product or a natural product. Suitable natural products are in particular resins such as gum rosin, wood rosin, tall oil resin and/or polyterpene resins, it being possible for these to be present in the modified and/or unmodified form, it being possible for the modification to be of natural or synthetic origin. Preferred terpeneoids are monoterpenes, sesquiterpenes, diterpenes, sesterterpenes, triterpenes, tetraterpenes and polyterpenes. Terpene resins are typically obtained by the polymerisation of terpenes, diterpenes and/or limonenes and terpene-phenol resins can be produced by the acid-catalysed addition of phenols to terpenes and/or colophony, but may also be based on other substances.

It is important for the organic component to contain at least one cyclic group. Monocyclic, dicyclic, tricyclic, tetracyclic and/or pentacyclic groups are preferred. A special embodiment consists of organic components containing at least one cyclic group with a $C_5$— ring and/or $C_6$— ring. In addition, the cyclic group can be completely or partially saturated. A special embodiment contains two or more C=C double bonds, at least two being conjugated with each other.

The organic component may additionally contain at least one compound with one or several functional groups such as e.g. amine groups, amide groups, amidine groups, imine groups, anhydride groups, ester groups, sulphate groups, sulphonate groups and/or thiol groups. Compounds with carboxyl groups, carbonyl groups, aldehyde groups and/or alcohol groups are particularly preferred, whereas resin acids and their derivatives are particularly preferred.

The following are, for example, suitable organic components: monoterpenes such as camphor, camphoric acid, isonitrosocamphor, camphor quinone, menthol, limonene, pinene, camphor carboxylic acid and/or alkyl hydroxyl methylene camphor as well as their derivatives and polymers produced therewith such as polyterpene resins, diterpenes such as e.g. neoabietic acid, levopinaric acid, pimaric acid, isopimaric acid, abietic acid, dehydroabietic acid, dihydroabietic acid, sylvic acid, palustric acid, colophony, retinal, tretinoine, agelasine E, agelasidine B, oxocativic acid, pinifolic acid, labdene dioic acid, dihydroxy-halima-diene dioic acid, epoxyclerodatrieneoic acid, isopimaradiene acid, isopimaric acid, isopimaradiene diol, isopimaratriene triol, junceic acid, podocarpinic acid, podocarpinol, roseine III, hydroxyoxorosenolide, cassaic acid, cassaidine, cassaine, cassamine, auricularic acid, cleistanthadienoic acid, isocopalene dial, abietadienoic acid, abietic acid, dihydroxy-abtietatrienoic acid, lanugone A, carnosolic acid, abeo-abietane, coleon P, cycloabietane, beyerene triol, beyerol, hydroxybeyerenic acid, dihydroxykaurenic acid, dihydroxykaurenolide, kahweol, methyl butanoyloxy-villanovane diol, dihydroxyatisenolide, dihydroxyatisanone, atisene dial, gibberelline gibberelline $A_1$, gibberelline $A_3$, giberellic acid, grayanotoxene pentol, leucothol, epoxygrayanotoxane pentol, rhodojaponin III, leucothol C, xeniolite A, xeniaacetal and/or dihydroxyserrulatanoic acid, isodictyohemiacetal and their derivatives, sester terpenes such as e.g. dysideapalaun acid, dalvisyriacolide, salvileucolide methyl ester, epoxyhydroxyoxoophiobol adienal, oxoophiobola tetraenal, ophiobolin A, ophiobolin G, dihydroxyscalarenolide and/or scalarin as well as their derivatives, triterpenes such as e.g. dipterocarpol, hydroxydammarenone II, dammarenolic acid, tirucallol, ursonic acid, oleanonic acid, isomasticadienonic acid, fusidinic acid, acetoxydihydroxyfusidadienoic acid, helvolinic acid, masticadienonic acid, diacetoxydioxofusidadienoic acid, trihydroxycycloartenic acid, pineapple acid, passiflorin, acetoxytrihydroxycucurbitadiene trione, cucurbitacin B, cucurbitacin F, ursolic acid, pentahydroxycucurbitadiene dione, hydroxyursanic acid, hydroxyursenic acid, pomolic acid, hydroxyoleanenoic acid, dihydroxyursenic acid, boswellinic acid, hydroxyursenic acid and/or hydroxyoxoursenic acid and their derivatives, whereby the components listed may also be present as a mixture and must not be understood to represent a limiting choice. Resin acids, in particular neoabietic acid, levopinaric acid, pimaric acid, isopimaric acid, abietic acid, dehydroabietic acid, dihydroabietic acid, sylvic acid, palustric acid and/or colophony are particularly preferred.

The organic component should have a melting point, determined by DSC (DIN 51007, of approximately −20 to 250° C., in particular of approximately 0 to 200° C. and particularly preferably of approximately 50 to 180° C. If the organic component has a melting range and not an actual melting point, the average temperature of the melting range is used to determine the melting point. If, for example, no melting point can be determined because of thermal decomposition, the softening point or the average temperature of the softening point can be used as an alternative instead of the melting point. Moreover, the molecular weight of the organic component should be between approximately 100 and 10,000, in particular between approximately 200 and 5000 and particularly preferably between approximately 300 and 2500. In the case of low-molecular compounds, this is typically determined via the structural formula and in the case of higher molecular products by means of static light scattering.

The organic component is typically insoluble or only slightly soluble in water. In a special embodiment, it is not or only slightly soluble in acidic to neutral water, the solubility being less than approximately 10% by weight, preferably less than approximately 1% by weight and in particular less than 0.1% by weight. In a further preferred embodiment, the organic component is partially or completely soluble in dilute caustic soda solution, the solubility being greater than approximately 0.01% by weight, preferably greater than approximately 0.1% by weight and in particular greater than approximately 1% by weight at a pH in the range of approximately 8 to 12. The solubilities relate to a temperature of 20° C.

It is helpful for the water-soluble organic polymeric protective colloid to form a stable dispersion with the organic component in aqueous solution, the dispersion still has after 24 hours the same physical properties such as e.g. pH, viscosity, particle size and colour, and a separation, e.g. settling out of dispersion particles, does not occur. Since, depending on the type of organic component, different water-soluble organic polymeric protective colloids provide the desired dispersion stability, an organic polymeric protective colloid may be ideal for certain organic components, whereas an incompatibility may occur with other organic components. For this reason, the organic polymeric protective colloid must be matched to the organic component. Stabilising systems are preferred which allow, in a simple manner, the aqueous dispersion composition obtained to be converted into powders which are redispersible in water.

Typically, suitable water-soluble organic polymeric protective colloids are preferably higher molecular compounds. These include natural compounds such as polysaccharides which, where required, are chemically modified, synthetic higher molecular oligomers and polymers which have either no or only a slightly ionic character and/or polymers which are produced in situ by means of monomers which have at least partially an ionic character, e.g. by means of radical polymerisation in an aqueous medium. It is also possible to use only one stabilising system or to combine different stabilising systems which each other.

Polysaccharides and polysaccharide ethers soluble in cold water such as cellulose ethers, starch ethers (amylose and/or amylopectin and/or their derivatives), guar ethers and/or dextrins are polysaccharides and their derivatives are preferably used. It is also possible to use synthetic polysaccharides such as anionic, nonionic or cationic heteropolysaccharides, in particular xanthan gum or wellan gum. The polysaccharides may be chemically modified, but need not be so, e.g. with carboxy methyl groups, carboxyethyl groups, hydroxyethyl groups, hydroxypropyl groups, methyl groups, ethyl groups, propyl groups and/or long-chain alkyl groups. Further natural stabilising systems consist of alginates, peptides and/or proteins such as e.g. gelatine, casein and/or soya protein. Dextrins, starch, starch ethers, casein, soya protein, hydroxyalkyl cellulose and/or alkyl hydroxyalkyl cellulose are particularly preferred.

Synthetic stabilising systems may also consist of one or several protective colloids. As an examples, there is/are one or several polyvinyl pyrrolidones and/or polyvinyl acetals with molecular weights of 200 to 400,000, completely or partially saponified and/or modified polyvinyl alcohols with a degree of hydrolysis of preferably approximately 70 to 100 mole %, in particular approximately 80 to 98 mole %, and a Höppler viscosity in 4% aqueous solution of preferably 1 to 50 mPas, in particular of approximately 3 to 40 mPas (measured at 20° C. according to DIN 53015) and melamine formaldehyde sulphonates, naphthalene formaldehyde sulphonates, block copolymers of propylene oxide and ethylene oxide, styrene maleic acid copolymers and/or vinyl ether maleic acid copolymers. Higher molecular oligomers may be nonionic, anionic, cationic and/or amphoteric emulsifiers such as e.g. alkyl sulphonates, alkyl aryl sulphonates, alkyl sulphates, sulphates of hydroxyl alcanols, alkyl sulphonates and alkyl aryl disulphonates, sulphonated fatty acids, sulphates and phosphates of polyethoxylated alcanols and alkyl phenols as well as esters of sulphosuccinic acid, quaternary alkyl ammonium salts, quaternary alkyl phosphonium salts, polyaddition products such as polyalkoxylates, e.g. adducts of 5 to 50 mole ethylene oxide and/or propylene oxide per mole of linear and/or branched $C_6$— to $C_{22}$— alcanols, alkyl phenols, higher fatty acids, higher fatty acid amines, primary and/or secondary higher alkyl amines, the alkyl groups being preferably a linear and/or branched $C_8$— to $C_{22}$— alkyl group in each case. Synthetic stabilising systems, in particular partially saponified, where required, modified, polyvinyl alcohols are particularly preferred, it being possible for one or several polyvinyl alcohols to be used together, where required with small quantities of suitable emulsifiers. Preferred synthetic stabilising systems are, in particular, modified and/or unmodified polyvinyl alcohols with a degree of hydrolysis of 80 to 98 mole % and a Floppier viscosity as 4% aqueous solution of 1 to 50 mPas and/or polyvinyl pyrrolidone. Water-soluble organic polymeric protective colloids with a higher content of carboxylic acid groups are, however, less preferred, in particular if they are produced by means of free radical polymerisation. Thus, the content of monocarboxylic acids and dicarboxylic acids and their anhydrides should be less than 50 mole %, preferably less than 25 mole % and in particular less than 10 mole %. Water-soluble organic polymeric protective colloids consisting of aromatic sulphonic acid condensates are, moreover, also less preferred.

The weight ratio of the organic component to the water-soluble organic polymeric protective colloid depends above all on the materials used and the effects to be achieved. It may be approximately 95:5 to 5:95, in particular approximately 90:10 to 10:90 and preferably approximately 80:20 to 20:80 and particularly preferably approximately 70:30 to 30:70.

The pH of the powder redispersible in water amounts, as 10% aqueous redispersion, typically to approximately 4.5 to 10.5, preferably approximately 5.0 to 9.5, but can in special cases such the addition of highly acidic or alkaline components, also be outside this range.

The inventive powder redispersible in water may also contain further additives. The content of additives, based on the sum total of the organic component and the water-soluble organic polymeric protective colloid is subject to no critical limits. Thus, it may be very low and lie within the framework of approximately 0.01% by weight or more, in particular approximately 0.1% by weight and preferably approximately 1% by weight in the case of interface-active substances, for example. On the other hand, considerably larger proportions of additives can be admixed to the powder according to the invention, such as e.g. fillers or film-forming dispersion powders redispersible in water which are typically obtained by drying synthetically produced film-forming aqueous polymeric dispersions based on emulsion polymerisation. In this case, up to approximately 1000 parts, in particular approximately 500 parts and preferably approximately 100 parts of further additives can be added per one part of the inventive powder redispersible in water.

There are no limits regarding the type of the further additives. As a rule, they play an important part in the application of the powder according to the invention, but this is not essential. It is quite possible to add further organic polymeric protective colloids, the addition preferably taking place in the form of a powder in this case.

Preferred additives consist of pulverous and/or liquid defoaming agents, wetting agents, alkyl polysaccharide ethers, hydroxyalkyl polysaccharide ethers and/or alkyl hydroxyalkyl polysaccharide ethers such as cellulose ether, starch ether and/or guar ether, the alkyl group and hydroxyalkyl group typically being a $C_1$— to $C_4$— group, synthetic polysaccharides such as anionic, nonionic or cationic heteropolysaccharides, in particular xanthan gum or wellan gum, cellulose fibres, dispersing agents, cement superplasticisers, setting accelerators, early strength accelerators, setting retarders, air entrainers, polycarboxylates, polycarboxylate ethers, polyacrylamides, completely and/or partially saponified and, where required, modified polyvinyl alcohols, polyvinyl pyrrolidones, polyalkylene oxides and polyalkylene glycols, the alkylene group being typically a $C_2$— and/or a $C_3$— group, which includes also block copolymers, dispersions and foam forming dispersion powders redispersible in water based on copolymers containing emulsion polymers such as e.g. those based on vinyl acetate, ethylene vinyl acetate, ethylene vinyl acetate vinyl versatate, ethylene vinyl acetate (meth)acrylate, ethylene vinyl acetate vinyl chloride, vinyl acetate vinyl versatate, vinyl acetate vinyl versatate (meth)acrylate, vinyl versatate (meth)acrylate, all (meth) acrylate, styrene acrylate and/or styrene butadiene, hydrophobing agents such as silanes, silane esters, siloxanes, silicones, fatty acids and/or fatty acid esters, thickening agents, fillers such as quartzitic and/or carbonaceous sands and/or flours such as quartz sand and/or powdered limestone, carbonates, silicates, layer silicates, precipitated silicic acid, light-weight fillers such as hollow microspheres of glass, polymers such as e.g. polystyrene spheres, aluminosilicates, silicon oxide, aluminium silicon oxide, calcium silicate hydrate, silicon dioxide, aluminium silicate, magnesium silicate, aluminium silicate hydrate, calcium aluminium silicate, calcium silicate hydrate, aluminium iron magnesium silicate, calcium metasilicate and/or volcanic slag as well as pozzolanic materials such as metakaolin and/or latent hydraulic components.

Especially particularly preferred additives are polymer dispersions, film-forming dispersion powders redispersible in water, polysaccharide ethers, superplasticisers and hydrophobing agents, in particular silanes, silane esters, fatty acids, fatty acid esters and/or oleic acid and their esters as well as other derivatives.

The invention relates also to a process for the production of powders redispersible in water, in particular for the production of the powders according to the invention, the organic components being dispersed and stabilised, in a first step, with the water-soluble organic polymeric protective colloid in water and the dispersion thus obtained being subsequently dried.

In this process, it is advantageous, but in no way essential for the organic component to be mixed in the liquid or viscous form with the organic polymeric protective colloid pre-dissolved in water. If the organic component is present in the solid form at room temperature, it may consequently be useful if it is heated. However, it is also possible for the organic component, in particular if it is insoluble in water, to be dissolved or swollen in an added additive and mixed, in this form, with the aqueous phase with the organic polymeric protective colloid. Suitable additives are frequently of a purely organic nature and present in the liquid form. They consist e.g. of silanes, silane esters, silicones and/or siloxanes, liquid defoaming agents and/or wetting agents, low molecular polyalkylene glycols, fatty acids and/or fatty acid derivatives.

In principle, all organosilicon compounds can be used as silanes, silane esters, silicones and/or siloxanes. However, it is advantageous, though not essential, if they are present in the liquid form and the boiling point of the organosilicon compounds is not too low at normal pressure, preferably approximately 100° C. or more. The organosilicon compounds may be soluble, insoluble or only partially soluble in water. In this respect, compounds are preferred which have either no or only limited solubility in water. Silicic acid esters with the formula $Si(OR')_4$, organoxy silanes with the formula $Si_n(OR')_{4-n}$ with n=3, polysilanes with the formula $R_3Si(SiR_2)_nSiR_3$ with n=0 to 500, preferably n=0 to 8, disiloxanes, oligosiloxanes and polysiloxanes of units with the general formula $R_cH_dSi(OR')_e(OH)_fO_{(4-c-d-e-f)/2}$ with c=0 to 3, d=0 to 2, e=0 to 3, if=0 to 3 and the sum total of c+d+e+f per unit being maximum 3.5, R' representing the same or different alkyl radicals or alkoxy alkylene radicals with 1 to 4 C atoms, preferably representing methyl or ethyl and R being the same or different and representing branched or unbranched alkyl radicals with 1 to 22 C atoms, cycloalkyl radicals with 3 to 10 C atoms, alkylene radicals with 2 to 4 C atoms, aryl radicals, aralkyl radicals, alkyl aryl radicals with 6 to 18 C atoms, it being possible for the radicals R mentioned to be also substituted with halogens such as F or Cl with ether groups, thioether groups, ester groups, amide groups, nitrile groups, hydroxyl groups, amine groups, carboxyl groups, sulphonic acid groups, carboxylic anhydride groups and carbonyl groups, it being possible in the case of the polysilanes for R also to have the meaning OR'.

Preferred organosilicon compounds consist of tetraalkoxysilanes, alkyl trialkoxysilanes, dialkyl dialkoxysilanes, it being possible for linear and/or branched $C_1$— to $C_{20}$— alkyl groups to be used as alkyl groups and linear and/or branched $C_1$— to $C_{10}$— alkoxy groups to be used as alkoxy groups, methoxy groups, ethoxy groups and/or isopropoxy groups being preferably used as the latter. In addition, it is possible to use also a copolymerisable alkylene group such as e.g. a vinyl group, allyl group and/or (meth)acrylic group instead of an alkyl group. Non-limiting examples are vinyl methyl dialkoxysilane, tetraethoxysilane, methyl tripropoxysilane, methyl triethoxysilane, γ-chloropropyl triethoxysilane, β-nitrile ethyl triethoxysilane, γ-mercaptopropyl triethoxysilane and γ-mercaptopropyl trimethoxysilane, phenyl triethoxysilane, n-octyl triethoxysilane and isooctyl triethoxysilane, dipropyl diethoxysilane, triphenyl silanol as well as their preferably liquid condensation products, where required with other low-boiling and/or water-soluble silanes such as methyl trimethoxysilane, γ-amino propyl triethoxysilane or other silanes containing amino functions, silanes containing quaternary ammonium salt groups and/or epoxy groups, carboxylic acid functional silanes and carboxylic anhydride functional silanes, disilanes such as dimethyl tetraalkoxydisilane, tetramethyl dialkoxysilane, trimethyl trialkoxydisilane or their (co)condensates generally obtainable from the corresponding chlorine compounds. Methyl hydrogen polysiloxanes end blocked by trimethyl siloxy groups, mixed polymers end blocked by trimethyl siloxy groups of dimethyl siloxane units and methyl hydrogen siloxane units and dimethyl polysiloxanes exhibiting in the terminal units a Si-bonded hydroxyl group are also particularly preferred.

In order to disperse the organic component with the water-soluble organic polymeric protective colloid in water, average to strong shear forces are usually advantageous and often also necessary. It can take place batchwise, continuously, e.g. via static mixers, or semi-continuously both at room temperature and at elevated temperature. If the organic component has an elevated melting point and is not dissolved, in this process, in another liquid substance the dispersion can also take place at temperatures of more than 100° C., the operation then preferably taking place at elevated pressure. In order to avoid partial or complete decomposition of the organic component, it is also possible to operate under a protective gas atmosphere, where required.

During the dispersion of the organic component in the water-soluble organic polymeric protective colloid, it is possible by the targeted adjustment of the different parameters, to vary in particular the particle size of the dispersion obtained. This includes the type and quantity of the water-soluble organic polymeric protective colloid. In the case of a very small particle size, a highly efficient distribution of the matrix used is achieved even with extremely small quantities. If the particle size is larger, the redispersed material develops its effect over a longer period. It is consequently frequently preferred to have a multi-modal particle size distribution at hand in order to have at hand both a high efficiency and a long-lasting effect. Thus, the average particle size of the particles dispersed in the dispersion may typically be between approximately 0.05 and 50 µm, in particular between approximately 0.1 and 20 µm and preferably between approximately 1 and 10 µm, it being necessary to ensure that the particle size is not too large, particularly in the case of low viscosity dispersions, in order to prevent sedimentation. This is of less importance in the case of dispersions of higher viscosity.

Regarding the solids content of the dispersion of organic components stabilised with the water-soluble organic polymeric protective colloid, the invention is subject to no critical limits at all. However, it is advantageous, as a rule, if the solids content is approximately 10 to 75% by weight, in particular approximately 25 to 65% by weight and preferably approximately 40 to 55% by weight. The dispersion obtained moreover typically has a Brookfield viscosity at 23° C., measured at 23° C. and 20 rpm according to DIN 53019, of approximately 100 to 50,000 mPas, in particular approximately 500 to 25,000 mPas and preferably approximately 1000 to 10,000 mPas.

Drying of the aqueous dispersion obtained preferably takes place by spray drying, freeze drying, fluid bed drying, drum drying and/or high speed drying, spray drying being particularly preferred and it being possible for spraying to take place by means of a spray wheel, a single or multiple substance nozzle. Where required, the aqueous solution can in addition be diluted with water in order to obtain a viscosity suitable for drying. There are basically no particular limits regarding the drying temperature. However, particularly for safety considerations, it should, as a rule, not exceed approximately 200° C., in particular 175° C. In order to achieve sufficiently efficient drying, temperatures of approximately 110° C. or higher, in particular approximately 120° C. or higher, are preferred.

The invention also relates to the process described, the drying step being omitted. The dispersion thus obtained is then processed in the liquid state, which is of relevance in particular in 2-component systems and industrial processing systems, such as in concrete.

The process according to the invention also involves the addition of further additives which, depending on the type and/or the process technology possibilities, are, as an example, initially mixed with the organic component and/or with the water-soluble organic polymeric protective colloid, added to the aqueous dispersion obtained and/or admixed, as powder, during and/or after drying to the powder obtained. However, liquid additives can also be sprayed onto the powder during or after drying. Preferably, the liquid and/or water-soluble additives are added before, during or after dispersion and additives in powder form are preferably mixed during or after drying of the powder obtained. Preferred liquid and/or water-soluble additives are silanes, silane esters, siloxanes, fatty acids and/or their derivatives, wetting agents, defoaming agents, control agents for cement hydration and/or for adjusting the rheology such as setting retarders, setting accelerators, cement superplasticisers, cement thickeners, air entrainers and/or film-forming aqueous polymeric dispersions based on emulsion polymers. Preferred additives in powder form consist of fillers, anticaking agents, film-forming dispersion powders redispersible in water based on emulsion polymers, polysaccharide ethers such as e.g. cellulose ether, starch ether and/or guar ether, control agents for cement hydration and/or rheology such as setting retarders, setting accelerators, cement superplasticisers and cement thickeners, air entrainers, cellulose fibres, dispersion agents, polyacrylamides, polycarboxylate ethers, hydrophobing agents in powder form, in particular based on silanes, silane esters and/or siloxanes, thickening agents, fillers such as carbonates, silicates, metakaolins and/or latent hydraulic components. The proportion of such additives can be very small, e.g. for interface-active substances and be within the region of approximately 0.01% by weight or more, in particular approximately 0.1% by weight and preferably approximately 1% by weight, based on the proportion of additive according to the invention. For other additives, such as fillers or film-forming dispersion powders redispersible in water based on emulsion polymers, this may amount to as much as approximately 1000 parts, in particular approximately 500 parts and preferably approximately 100 parts, based on one part by weight of the sum total of the organic component and the water-soluble organic polymeric protective colloid.

A special embodiment is a process in which the aqueous dispersion obtained is dried jointly with the film-forming aqueous polymeric dispersion based on emulsion polymers, film-forming dispersion powders redispersible in water being obtained which greatly reduce the efflorescence in hydraulically set systems and, where required, prevent it completely. In addition, the aqueous dispersion may, where required, be added also to other dispersions to be dried, in particular those for rendering the hydraulically set compounds hydrophobic, e.g. to dispersions based on silanes, silane esters, siloxanes, silicones, fatty acids and/or fatty acid esters, after drying hydrophobing agents in powder redispersible in water being obtained form, which greatly reduce the efflorescence in hydraulically set systems and, where required, prevent it completely. In this connection, it is possible to mix the dispersion to be dried with each before drying and to spray and dry them jointly or to spray them separately simultaneously via a two-substance or multiple-substance nozzle and to dry them subsequently simultaneously with each other. If the other dispersion to be dried contains a sufficiently high proportion of water-soluble organic polymeric protective colloid such that free protective colloid is still available, the organic component may be dried also jointly with the other dispersion as an emulsifier-stabilised dispersion. The weight ratio of the organic component to free protective colloid must be at least approximately 95:5, preferably at least approximately 90:10. However, it is of advantage if the water-soluble organic polymeric protective colloid used for the production of the aqueous polymeric dispersion and for the production of film-forming dispersion powder redispersible in water is also selected in such a way that the content of monocarboxylic acids and dicarboxylic acids as well as their anhydrides is less than 50 mole %. Moreover, aromatic sulphonic acid condensates are also less preferred. The ratio of the two dispersions to be dried may be adjusted at random in line with the effect to be achieved. Thus, the proportion of solids in the dispersion according to the invention based on the powder dried jointly, may be approximately 0.1 to 99% by weight, preferably approximately 1 to 95% by weight and in particular approximately 5 to 80% by weight.

The powder redispersible in water which is obtained typically exhibits a high level of wettability and redispersibility in water. Ideally, it redisperses on mere contact with water within a few seconds, if need be as a result of light stirring. In certain cases, it is also possible for somewhat stronger shear forces to be necessary. In any case, the shear forces occurring during normally executed mixing processes for dry mortars are as a rule sufficient to completely redisperse the powder according to the invention and to achieve a homogeneous distribution in the matrix to be redispersed. During this process, the particle size of the aqueous dispersion is obtained again before drying.

In addition, the invention also relates to the use of a powder redispersible in water in hydraulically setting systems for the reduction of efflorescence in hydraulically set systems based on at least one organic component and at least one water-soluble organic polymeric protective colloid and, where required, other additives. The organic component contains at least one compound with a cyclic group which is completely or partially saturated and has a melting point of approximately −20 to 250° C. and a molecular weight of approximately 100 to 10,000, the organic component being a terpeneoid, an resin acid, colophony, terpene resin, terpene-phenol resin and/or their derivative and forming a stable dispersion in water with the water-soluble organic polymeric protective colloid. The weight ratio of the organic component to the water-soluble organic polymeric protective colloid is approximately 95:5 to 5:95. In addition, 0 to approximately 1000 parts by weight, based on one part by weight of the sum total of the organic component and the water-soluble organic polymeric protective colloid, at least one film-forming dispersion powder redispersible in water based on a film-forming dispersion and/or further additives may be contained therein.

The invention moreover relates also to the use of an aqueous dispersion, produced according to the process described above, in hydraulically setting systems for the reduction of efflorescence in hydraulically set systems based on at least one organic component and at least one water-soluble organic polymeric protective colloid and, where required, further additives. The aqueous dispersion produced, based on 100 parts, by weight of the sum total of the organic component and the water-soluble organic polymeric protective colloid, is based on approximately 5 to 95 parts by weight, preferably approximately 10 to 90 parts by weight, in particular approximately 20 to 80 parts by weight, of at least one organic component which contains preferably colophony, abietic acid, sylvic acid, neoabietic acid, levopinaric acid, pimaric acid, isopimaric acid and/or palustric acid and/or their derivatives, based on approximately 5 to 95 parts by weight, preferably approximately 10 to 90 parts by weight, in particular approximately 20 to 80 parts by weight of at least one water-soluble organic polymeric protective colloid, this representing at least one modified and/or unmodified polyvinyl alcohol with a degree of hydrolysis of approximately 70 to 100 mole %, in particular of approximately 80 to 98 mole % and a Höppler viscosity as 4% aqueous solution of approximately 1 to 50 mPas, in particular of approximately 3 to 40 mPas (measured at 20° C. according to DIN 53015) and/or polyvinyl pyrrolidone, and/or approximately 20 to 90 parts by weight, preferably approximately 25 to 90 parts by weight, of water-soluble organic polymeric protective colloid, this representing at least one natural and/or synthetically produced biopolymer, which, where required, is synthetically modified and is in particular starch, starch ether, dextrins, cellulose ether, casein and/or soya protein. In addition, 0 to approximately 500 parts by weight, preferably 0 to approximately 250 parts by weight, of at least one silane component and/or siloxane component as well as 0 to approximately 10,000 parts by weight, preferably approximately 0 to 2000 parts by weight of a film-forming aqueous polymeric dispersion, based on 100 parts by weight of the sum total of the organic component and the water-soluble organic polymeric protective colloid respectively may be contained therein. The proportion of solids of the aqueous dispersion is between approximately 10 and 70% by weight, in particular between approximately 25 and 65% by weight and preferably between approximately 40 and 55% by weight, the average particle size of the dispersed particles is between approximately 0.05 and 50 μm, in particular between approximately 0.1 and 20

μm and preferably between approximately 1 and 10 μm and the Brookfield viscosity amounts to approximately 100 to 50,000 mPas and preferably approximately 250 to 25,000 mPas and in particular approximately 500 to 10,000 mPas.

The inventive powder redispersible in water and the non-dried aqueous dispersion are preferably used in hydraulically setting compounds, in particular in concretes and dry mortars. Such dry mortar formulations contain, apart from the powder according to the invention, in particular at least one hydraulically setting binder and typically further mortar formulation additives, such as e.g. fillers such as sand, silicates and/or carbonates, organic binders such as film-forming dispersion powders redispersible in water based on emulsion polymers and/or polyvinyl alcohol, rheology control additives such as polysaccharide ether, casein, superplasticisers and/or thickeners and/or hydration control additives such as accelerators and/or retarders. The hydraulically setting binder is Portland cement, e.g. according to EN 196 CEM, I, II, III, IV and V, calcium sulphate in the form of α-hemi-hydrate and/or β-hemi-hydrate and/or anhydrite, high alumina cement and/or lime, usually in the form of calcium hydroxide and/or calcium oxide. Portland cement, high alumina cement and/or calcium sulphate are preferred. The proportion of powder according to the invention is in this case 0.01 to 25% by weight, in particular approximately 0.1 to 10% by weight and preferably approximately 0.2 to 5% by weight, based on the hydraulically setting binder. If the non-dried aqueous dispersion is used, it can be added to the hydraulically setting formulation either as such and/or together with liquid polymer dispersions and/or other liquid additives either together with the mixing water or separately.

The dry mortars containing the powder according to the invention are preferably used where the applied and dried mortars may come into more or less regular contact with water. Apart from typical applications in the open air such e.g. thermal insulation mortars, sealing compounds, gypsum- and/or lime and/or cement plasters, spray and/or repair mortars, spray and/or repair concretes as well as polymer cement concretes (PCC) and/or polymer cement spray concretes (S-PCC), these consist of tile grout adhesives, plywood mortars, bonding agent mortars, cementitious parquet adhesives, cement sizings, tile adhesives, levelling and/or trowelling compounds. In addition, the powders according to the invention and the non-dried aqueous dispersions can be used as concrete additive and/or as additive for a protective coating on concrete.

In this respect, it is highly advantageous for the powder according to the invention and the dispersion according to the invention, apart from greatly reducing efflorescence, to behave in a rheology neutral manner in the hydraulically setting systems and in the quantities used, in particular if synthetic stabilising systems are employed. Moreover, the setting behaviour of the hydraulically setting system is influenced either not at all or only insignificantly. The good mixing behaviour, good wettability and easy processability of the mortar and concrete are also of great importance. Moreover, the hydrophobicity is also improved in many cases, which, as a rule, is a welcome additional effect.

Moreover, it is also possible to use the powder according to the invention and/or the aqueous dispersion produced according to the process described in adhesives. In this case, it is particularly advantageous to use the powder in powder adhesives, in particular in cases where a high cohesion is desired as early as during the early drying phase.

The invention is explained by way of the following examples.

A) PRODUCTION OF AQUEOUS DISPERSIONS AND OF POWDERS REDISPERSIBLE IN WATER

Example 1

Production of Powder 1

100 g of a 20% polyvinyl alcohol solution with a degree hydrolysis of 88 mole % and a Floppier viscosity, as 4% solution, of 4 mPas were heated to 85° C. in a 500 ml glass vessel with a propeller stirrer with stirring at 1000 rpm. Subsequently 20 g of solid colophony (Fluke) were added slowly, the colophony being dispersed completely. A stable, light yellowish dispersion with a solids content of 33% by weight, a Brookfield viscosity at 23° C. of 10,000 mPas at 20 rpm and an average particle size of the dispersed particles of 9 μm which can be modified simply by changing the process parameters, was obtained. The dispersion obtained was dried without further additives by conventional spray drying at an initial temperature of 125° C. to form a yellowish, free-flowing powder redispersing in water, whereby no contamination worth mentioning was observed in the spray tower and the yield was within the normal range.

Example 2

Production of Powder 2

Example 1 was repeated, although 46.7 g of solid colophony was added. A stable, light yellowish dispersion with a proportion of solids of 45% by weight, a Brookfield viscosity at 23° C. of 1,000 mPas and 20 rpm and an average particle size of 8 μm which could be modified simply by modifying the process parameters, was obtained. After spray drying, a yellowish, free-flowing powder redispersible in water was obtained, whereby no contamination worth mentioning was observed in the spray tower and the yield was within the normal range.

Example 3

Production of Powder 3

25.0 g of solid colophony were dissolved at room temperature in 25.0 g of a liquid alkyl triethoxysilane with stirring in a 100 ml vessel. A stable, low-viscosity, yellowish solution was obtained. The solution was added slowly at room temperature with stirring to 375 g of a 20% polyvinyl alcohol solution with a degree of hydrolysis of 88 mole % and a Floppier viscosity, as 4% solution, of 4 mPas in an 800 ml glass vessel. A light yellowish dispersion with a proportion of solids of 29% by weight was obtained which was adjusted to a pH of 7 with 0.1N caustic soda solution and subsequently spray dried as in example 1. A yellowish, free-flowing powder redispersible in water was obtained, whereby no contamination worth mentioning was observed in the spray tower and the yield was within the normal range.

Example 4

Production of Powder 4

28 g of the dispersion produced according to example 1 were added to 73 g of an EVA-dispersion with a solids content of 51% by weight and a glass transition temperature $T_g$ of −3° C. and subsequently spray dried as in example 1. A yellowish free-flowing powder redispersible in water was obtained, whereby no contamination worth mentioning was observed in the spray tower and the yield was within the normal range.

Comparative Example 5

Production of Powder 5

Example 1 was repeated, although 20 g of solid stearic acid (Fluka) were added to the polyvinyl alcohol solution instead of colophony. A white dispersion with a proportion of solids of 33% by weight was obtained which was subsequently dried as in example 1 to form a white, free-flowing powder redispersible in water.

Comparative Example 6

Production of Powder 6

Example 1 was repeated, although 20 g of carnauba wax (Merck; consisting of approximately 85% wax esters) were added to the polyvinyl alcohol solution instead of colophony. A light yellowish dispersion with a proportion of solids of 33% by weight was obtained which was subsequently dried as in example 1 to form a light yellowish, free-flowing powder redispersible in water.

Example 7

Production of Powder 7

30 g of solid polyvinyl pyrrolidone (PVP-K90; Fluka) and 90 g of water were heated to 85° C. in a 500 ml glass vessel with a propeller stirrer with stirring at 1000 rpm. After the polyvinyl pyrrolidone had dissolved, 30 g of solid colophony (Fluka) were added slowly, the colophony being dispersed completely. A stable, light yellowish dispersion with a proportion of solids of 40% by weight, a Brookfield viscosity at 23° C. of 10,000 mPas at 20 rpm and an average particle size of 3.7 μm which could be simply modified by modifying the process parameters, was obtained. The dispersion obtained was dried without further additives by conventional spray drying at an initial temperature of 125° C. to form a yellowish, free-flowing powder redispersing in water, whereby no contamination worth mentioning was observed in the spray tower and the yield was within the normal range.

Example 8

Production of Powder 8

To 200 g of a commercially obtainable aqueous dispersion stabilised with anionic emulsifiers and based on a modified colophony and with a proportion of solids of 30% by weight were added 24 g of a 25% polyvinyl alcohol with a degree hydrolysis of 88 mole % and a Höppler viscosity, as 4% solution, of 4 mPas, with stirring. A stable, light yellowish dispersion with a solids content of 29.5% by weight was obtained. The dispersion obtained was dried without further additives by conventional spray drying at an initial temperature of 125° C. to form a yellowish, free-flowing powder redispersible in water, whereby no contamination worth mentioning was observed in the spray tower and the yield was within the normal range.

Example 9

Production of Powder 9

To 150 g of an aqueous dispersion stabilised with polyvinyl alcohol and based on vinyl acetate/vinyl versatate with a proportion of solids of 40.5% by weight, 30 g of a commercially obtainable aqueous solution stabilised with amphoteric emulsifiers and based on a modified colophony and with a proportion of solids of 30% by weight and 30 g of a 25% polyvinyl alcohol solution with a degree of hydrolysis of 88 mole % and a Höppler viscosity, as 4% solution, of 4 mPa were added. 1.5 g of a defoaming agent were added to the dispersion thus obtained. Subsequently, dilution was carried out with water to a solids content of 25% by weight. The dispersion thus obtained was dried by conventional spray drying at an initial temperature of 125° C. to form a light yellowish, free-flowing powder redispersible in water, whereby no contamination worth mentioning was observed in the spray tower and the yield was within the normal range.

Example 10

Production of Dispersion 1

10 g of abietic acid (Fluke) were dissolved in 20 g of spirit of turpentine (Fluke). A slightly viscous and slightly turbid solution was obtained. The solution was added slowly with stirring at room temperature to 150 g of a 20% polyvinyl alcohol solution with a degree of hydrolysis of 88 mole % and a Höppler viscosity, as 4% solution, of 4 mPas. A stable, whitish dispersion with a solids content of 33% by weight was obtained. The dispersion obtained was used directly in the mortar mixture.

Comparative Example 11

Production of Dispersion 2

10 g of naphthyl acetic acid (Fluka) were dissolved in 10 g of acetone. The solution was added slowly with stirring at room temperature to 50 g of a 20% polyvinyl alcohol solution with a degree of hydrolysis of 88 mole % and a Höppler viscosity, as 4% solution, of 4 mPas. A stable, whitish dispersion with a solids content of 43% by weight was obtained. The dispersion obtained was used directly in the mortar mixture.

B) TECHNICAL APPLICATION TESTS USING DIFFERENT CEMENTITIOUS COMPOUNDS

Application Example 1

35.0 parts of white Portland cement, 19.2 parts of quartz sand (0.08-0.2 mm), 41.0 parts of calcium carbonate Durcal 65, 0.3 parts of a cellulose ether (viscosity as 2% aqueous solution: 3200 mPas), 2.0 parts of the pigment Bayferrox 110 and 1.0 parts of construction lime were thoroughly mixed and used as basic dry mortar formulation. To this, different powders were added in varying quantities as shown in table 1, which could be stirred simply into the mortar matrix without further special mixing processes. The formulations were mixed in each case with 32 parts of water, based on 100 parts of dry formulation, using a 60 mm propeller stirrer operating at a rate 950 rpm for seconds, the quantity of mixing water indicated being added with stirring. After a maturing time of 3 minutes, the mortar was briefly stirred again by hand and applied by means of a serrated trowel onto an stoneware tile of a thickness of 6 mm to an area of (196 mm×50 mm), the tiles having been saturated with water immediately beforehand. Two different samples were produced in each case, the mortar having been applied by means of spacer rails in a layer thickness of 2.2 mm (1.0 mm respectively).

The test specimens were subsequently mounted immediately to a container with water in a climatic chamber cooled to 7° C., the water being warmed to a constant 20° C. The container was designed in such a way that the test specimens were lying at least 5 cm above the water surface and had an inclination at an angle of 45°. The surface area not covered by the test specimens was covered and isolated such that water vapour penetrates through the carrier material into and through the test specimens. After a storage period of 7 days, the surface was assessed optically for efflorescence (eye and microscope).

TABLE 1

Technical application examples using a pigmented cementitious trowelling compound with a thickness of 2.2 mm for assessing efflorescence. The mortar processability was good in the case of all the specimens and the mortar consistency comparable to the reference respectively.

| Test no. | Basic recipe [% by weight] | Powder/ disp.[a] | No. | Quantity used[b] [% by weight] | Efflorescence |
|---|---|---|---|---|---|
| B-1- (Reference) | 100 | N/A | N/A | 0 | Extremely Strong |
| B-2 | 99.8 | P | 1 | 0.2 | None |
| B-3 | 99.6 | P | 3 | 0.4 | None |
| B-4 | 98.0 | P | 4 | 2.0 | None |
| B-36 | 99.6 | P | 7 | 0.4 | None |
| B-38 | 99.6 | P | 8 | 0.4 | None |
| B-39 | 99.8 | P | 8 | 0.2 | None |
| B-40 | 99.8 | D | 1 | 0.2 | None |
| B-41 | 99.9 | D | 1 | 0.1 | None |
| B-42 | 99.0 | P | 9 | 2.0 | None |
| B-5 (comp) | 99.8 | P | 5 | 0.2 | Extremely Strong |
| B-6 (comp) | 99.6 | P | 5 | 0.4 | Extremely Strong |
| B-7 (comp) | 99.8 | P | 6 | 0.2 | Extremely Strong |
| B-8 (comp) | 99.6 | P | SEAL80[c] | 0.4 | Strong |
| B-9 (comp) | 99.8 | P | SEAL80[c] | 0.2 | Strong |

[a]"P" represents powder, "D" dispersion.
[b]In the case of powders, the quantity used relates to the quantity of powder employed, in the case of dispersions to the solids content of the dispersion.
[c]Elotex Seal80 is a redispersible hydrophobing agent based on a special silane and polyvinyl alcohol.

The results clearly show that all colophony-containing specimens suppressed the efflorescence so strongly or even eliminated them completely such that none could be observed even under the microscope. The reference specimens, on the other hand, exhibited very strong efflorescence.

Application Example 2

Samples produced in a manner analogous to those of the application example 1 were stored for 7 days at 23° C. and a relative humidity of 50%. To assess the hydrophobicity, the time was subsequently determined, which passed until 5 drops of water (approximately 0.2 g) had disappeared from the surface.

TABLE 2

Technical application examples using a pigmented cementitious trowelling compound in a layer thickness of 2.2 mm for assessing hydrophobicity.

| Test no. | Basic recipe [% by weight] | Powder/ disp.[a] | No. | Quantity used[b] [% by weight] | Efflorescence |
|---|---|---|---|---|---|
| H-1 (Ref.) | 100 | P | N/A | 0 | Immediately |
| H-2 | 99.6 | P | 2 | 0.4 | 240 |
| H-3 | 99.8 | P | 2 | 0.2 | 20 |
| H-4 (comp) | 99.6 | P | 5 | 0.4 | Immediately |
| H-5 (comp) | 99.8 | P | SEAL80[c] | 0.2 | 150 |
| H-6 (comp) | 99.6 | P | SEAL80[c] | 0.4 | 370 |

[a], [b], [c] compare Table 1.

The data in Table 2 show the excellent hydrophobing properties of Elotex Seal80, although this provides no or only a slight reduction of efflorescence (compare other examples). The powders according to the invention, on the other hand, exhibit also a good mortar hydrophobicity with a rising proportion, apart from a strong reduction of the efflorescence. Powder 5 containing stearic acid, which is well known to be a hydrophobing agent, however, exhibits neither hydrophobicity nor a reduction of the efflorescence.

Application Example 3

Application example 1 was repeated, the layer thickness being adjusted to 1.0 mm.

TABLE 3

Technical application examples using a pigmented cementitious trowelling compound with a thickness of 1.0 mm for assessing efflorescence.

| Test no. | Basic recipe [% by weight] | Powder/ disp.[a] | No. | Quantity used[b] [% by weight] | Efflorescence |
|---|---|---|---|---|---|
| B-10 (Reference) | 100 | P | N/A | 0 | Strong |
| B-11 | 99.8 | P | 1 | 0.2 | None |
| B-12 | 99.6 | P | 3 | 0.4 | None |
| B-13 | 98.0 | P | 4 | 2.0 | None |
| B-43 | 99.6 | P | 7 | 0.4 | None |
| B-44 | 99.8 | P | 7 | 0.2 | None |
| B-45 | 99.8 | D | 1 | 0.2 | None |
| B-46 | 99.9 | D | 1 | 0.1 | None |
| B-47 | 99.6 | P | 8 | 0.4 | None |
| B-48 | 99.8 | P | 8 | 0.2 | None |
| B-49 | 98.0 | P | 9 | 2.0 | None |
| B-14 (comp) | 99.8 | P | 5 | 0.2 | Strong |
| B-15 (comp) | 99.6 | P | 5 | 0.4 | Strong |
| B-16 (comp) | 99.8 | P | 6 | 0.2 | Strong |
| B-17 (comp) | 99.6 | P | SEAL80[c] | 0.4 | Little |
| B-18 (comp) | 99.8 | P | SEAL80[c] | 0.2 | Strong |

[a], [b], [c] compare Table 1.

The results show a clear reduction in efflorescence also in thinly applied mortars insofar as a powder according to the invention or a dispersion to the invention is used. Powder 4 in experiment No B-13 clearly shows also that the powder according to the invention can also be added to film-forming dispersion powders redispersible in water based on emulsion polymers, for example, and can be used as such in mixture.

Application Example 4

28.0 parts of white Portland cement, 25.0 of quartz sand 0.1-0.3 mm, 8.0 parts of sand 0.7-1.2 mm, 35.0 parts of sand 1.5-2.2 mm, 0.05 parts of a cellulose ether (viscosity as 2% aqueous solution: 15,000 mPas) and 2.0 parts of the pigment Bayferrox 110 were thoroughly mixed and used as a basic dry mortar formulation. The formulations were mixed with 18 parts of water, based on 100 parts of dry formula, respectively, and tested in a manner analogous to application example 1.

TABLE 4

Technical application examples using a decorative pigmented render in a layer thickness of 2.2 mm for assessing efflorescence. The mortar processability was equally good in the case of all specimens and the mortar consistency comparable in each case with the reference.

| Test no. | Basic recipe [% by weight] | Powder/ disp.[a] | No. | Quantity used[b] [% by weight] | Efflorescence |
|---|---|---|---|---|---|
| B-19 (Reference) | 100 | P | N/A | 0 | Very strong |
| B-20 | 99.8 | P | 1 | 0.2 | None |
| B-21 | 99.8 | P | 3 | 0.2 | None |
| B-22 | 98.0 | P | 4 | 2.0 | None |
| B-50 | 99.6 | P | 7 | 0.4 | None |
| B-51 | 99.8 | P | 7 | 0.2 | None |
| B-52 | 99.8 | D | 1 | 0.2 | None |
| B-53 | 99.9 | D | 1 | 0.1 | None |
| B-54 (comp) | 99 | D | 2 | 1 | Very strong |
| B-55 (comp) | 99.5 | D | 2 | 0.5 | Very strong |
| B-56 | 99.6 | P | 8 | 0.4 | None |
| B-57 | 99.8 | P | 8 | 0.2 | None |
| B-58 | 98.0 | P | 9 | 2.0 | None |
| B-23 (comp) | 99.8 | P | 5 | 0.2 | Very strong |
| B-24 (comp) | 99.6 | P | 5 | 0.4 | Very strong |
| B-25 (comp) | 99.8 | P | 6 | 0.2 | Very strong |
| B-26 (comp) | 99.6 | P | SEAL80[c] | 0.4 | Strong |

[a], [b], [c] compare Table 1.

The results listed demonstrate that the strong reduction of the efflorescence occurs also in a decorative pigmented render.

Application Example 5

40.0 parts of white Portland cement, 3 parts of aluminate cement, 50.0 parts of quartz sand 0.1-0.3 mm, parts of a hydrophobic, film-forming dispersion powder redispersible in water and based on an emulsion polymers (Elotex WS45), 1 part of cellulose fibre, 0.10 parts of tartaric acid and 2.0 parts of the pigment Bayferrox 110 and 1.0 part of construction lime were thoroughly mixed and used as basic dry mortar formulation. The formulations were mixed with 22 parts of water, based on 100 parts of dry formulation, in each case, and tested in a manner analogous to application example 1.

TABLE 5

Technical application examples using a joint mortar in a layer thickness of 2.0 mm for assessing efflorescence. The mortar processability was equally good in the case of all specimens and the mortar consistency comparable to the reference in each case.

| Test no. | Basic recipe [% by weight] | Powder/ disp.[a] | No. | Quantity used[b] [% by weight] | Efflorescence |
|---|---|---|---|---|---|
| B-27 (Reference) | 100 | P | N/A | 0 | Strong |
| B-28 | 99.6 | P | 2 | 0.4 | None |
| B-29 | 99.8 | P | 2 | 0.2 | None |
| B-30 | 99.6 | P | 3 | 0.4 | None |
| B-31 (comp) | 99.6 | P | SEAL80[c] | 0.4 | Strong |

[a], [b], [c] compare Table 1.

The results listed demonstrate that the strong reduction of the efflorescence occurs also in a joint mortar.

Application Example 6

32.0 parts of white Portland cement, 1 part of aluminate cement, 65.0 parts of quartz sand (0-0.2 mm), 0.35 parts of calcium sulphate, 0.75 parts of a hydrophobic, film-forming dispersion powder redispersible in water and based on an emulsion polymers (Elotex HD1501), 0.25 parts of a superplasticisers based on melamine sulphonate, 0.1 part of a defoaming agent in powder form, 0.5 parts of black iron oxide and 0.05 parts of a cellulose ether (viscosity as 2% aqueous solution: 4000 mPas) were thoroughly mixed and used as basic dry mortar formulation. The formulations were mixed with 17.5 parts of water, based on 100 parts of dry formulation, in each case, and tested in a manner analogous to application example 1.

TABLE 6

Technical application examples using a joint mortar in a layer thickness of 2.0 mm for assessing efflorescence. The mortar processability was equally good in the case of all specimens and the mortar consistency comparable to the reference in each case.

| Test no. | Basic recipe [% by weight] | Powder/ disp.[a] | No. | Quantity used[b] [% by weight] | Efflorescence |
|---|---|---|---|---|---|
| B-32 (Reference) | 100 | P | N/A | 0 | Very strong |
| B-33 | 99.8 | P | 2 | 0.2 | None |
| B-34 | 99.6 | P | 3 | 0.4 | None |
| B-35 (comp) | 99.6 | P | SEAL80[c] | 0.4 | Strong |

[a], [b], [c] compare Table 1.

The results listed demonstrate that the strong reduction or even the total prevention of efflorescence occurs not only in different joint mortars, but also in a wide varieties of different mortars. Surprisingly enough, only a very small proportion of these additives is used for this purpose, which has no or only a very minor effect on the other mortar properties—be it in fresh mortar or in the set state.

Although the colophony used is classified as a hazardous substance, the hazards potential is reduced by the encapsulation of the colophony with polyvinyl alcohol. Moreover, handling usually causes essentially fewer problems since the powder is free-flowing and consequently conveying, metering and mixing can be carried out without major effort and often be automated.

The invention claimed is:

1. Process for the production of powder redispersible in water, said powder comprising: an organic component, a water-soluble organic polymeric protective colloid and, optionally, one or more further additives,
   wherein the organic component contains at least one compound with a cyclic group, the cyclic group being completely or partially saturated and having a melting point of approximately −20 to 250° C. and a molecular weight of about 100 to 10,000, and the organic component further contains a terpeneoid, a resin acid, colophony, terpene resin, terpene-phenol resin and/or their derivatives, and
   wherein the water-soluble organic polymeric protective colloid has a content of monocarboxylic acid and dicarboxylic acid as well as their anhydrides of less than 50 mole %, and not consisting of aromatic sulfonic acid condensates, and
   said process comprising the steps of:
   dispersing the organic component in water to obtain an aqueous dispersion,
   stabilizing the aqueous dispersion with the water-soluble organic polymeric protective colloid, wherein the weight ratio of the organic component to the water-soluble organic polymeric protective colloid is 95:5 to 5:95, and
   drying the aqueous dispersion by spray drying, freeze drying, and/or fluid bed drying, thereby forming the redispersible powder.

2. The process according to claim 1 characterised in that the solids content of the stabilized dispersion is 10 to 75% by weight and the average particle size of the dispersed particles to 0.05 to 50 µm.

3. The process according to claim 1 wherein further liquid and/or water-soluble additives are added before, during or after formation of the dispersion, and further additives in powder form are added during or after drying.

4. The process according to claim 1 further comprising the step of mixing the obtained redispersible powder with film-forming dispersion powders redispersible in water, redispersible hydrophobing agents in powder form based on silanes, siloxanes, silicones, fatty acids and/or fatty acid esters and/or polysaccharide ethers.

5. The process according to claim 1 wherein the aqueous dispersion is dried jointly with at least one other dispersion based on film-forming polymers and/or silanes, silane esters, siloxanes, silicones, fatty acids and/or fatty acid esters, wherein the dispersions are mixed with each other before drying or sprayed separately and subsequently dried jointly.

6. The process according to claim 5 wherein the aqueous dispersion is stabilised by emulsifiers and the at least one other dispersion comprises an excess of water-soluble organic polymeric protective colloid in water, the water-soluble organic polymeric protective colloid having a content of monocarboxylic and dicarboxylic acids and their anhydrides of less than 50 mole % and not consisting of aromatic sulfonic acid condensates.

7. Powder redispersible in water obtained from the process according to claim 6.

8. The process according to claim 1 characterised in that the cyclic group of the organic component is a monocyclic, dicyclic, tricyclic, tetracyclic and/or pentacyclic group.

9. The process according to claim 1 characterised in that the organic component is a natural product selected from the group consisting of a monoterpene, sesquiterpene, diterpene, sesterterpene, triterpene, tetraterpene, polyterpene and their derivatives.

10. The process according to claim 1 characterised in that the organic component is at least one compound with at least one carboxyl group, carbonyl group, aldehyde group and/or alcohol group.

11. The process according to claim 1 characterised in that the organic component is abietic acid, sylvic acid, neoabietic acid, levopinaric acid, pimaric acid, isopimaric acid and/or palustric acid and/or their derivatives.

12. The process according to claim 1 characterised in that the organic component is not soluble in acidic to neutral water.

13. The process according to claim 1 characterised in that the water-soluble organic polymeric protective colloid representing a synthetic protective colloid is a modified and/or unmodified polyvinyl alcohol with a degree of hydrolysis of 70 to 100 mole % and a Höppler viscosity, as 4% aqueous solution, of 1 to 50 mPas, measured at 20° C. according to DIN 53015, and/or polyvinyl pyrrolidone.

14. The process according to claim 1 characterised in that the solids content of the dispersion of the organic component stabilised with the water-soluble organic polymeric protective colloid amounts to 25 to 65% by weight and the average particle size of the dispersed particles is 0.1 to 20 µm.

* * * * *